(12) United States Patent
Anei

(10) Patent No.: US 7,154,079 B2
(45) Date of Patent: Dec. 26, 2006

(54) MOVING OBJECT DETECTING SYSTEM AND MOVING OBJECT DETECTING METHOD

(75) Inventor: Shin Anei, Takarazuka (JP)

(73) Assignee: Konica Minolta Holdings, Inc. (JP)

( * ) Notice: Subject to any disclaimer, the term of this patent is extended or adjusted under 35 U.S.C. 154(b) by 139 days.

(21) Appl. No.: 10/955,515

(22) Filed: Sep. 30, 2004

(65) Prior Publication Data

US 2005/0263684 A1  Dec. 1, 2005

(30) Foreign Application Priority Data

May 26, 2004  (JP) ............... 2004-156363

(51) Int. Cl.
*H01J 40/14* (2006.01)
*G08B 13/18* (2006.01)

(52) U.S. Cl. ............. 250/221; 250/222.1; 340/555; 348/145

(58) Field of Classification Search ........... 250/221, 250/222.1; 340/555–557; 348/143–145; 382/103
See application file for complete search history.

(56) References Cited

U.S. PATENT DOCUMENTS 5,393,973 A * 2/1995 Blau .................. 250/221
5,420,430 A * 5/1995 Trett .................. 250/341.1
6,600,509 B1  7/2003 Radford et al. .......... 348/143

FOREIGN PATENT DOCUMENTS

JP  08-161453  6/1996
JP  2001-505006  4/2001

\* cited by examiner

*Primary Examiner*—Kevin Pyo
(74) *Attorney, Agent, or Firm*—Brinks Hofer Gilson & Lione

(57) ABSTRACT

One-dimensional line data is produced based upon an evaluation area in image data obtained by imaging the area the slit light beam is irradiated. Each point data value included in the line data is obtained based upon each pixel value in a pixel array arranged in a Y-axis direction having the same X coordinates in the evaluation area. The point data value in the line data depends upon the result of the difference between the pixel values of the adjacent pixels in the pixel array. The affect by the reflected light of the slit light beam from the surface of the moving object is offset between the adjacent pixels, so that it is not reflected on the point data value. The point data value corresponding to the blocked state and the point data value corresponding to the non-blocked state can be made clearly different from each other.

13 Claims, 13 Drawing Sheets

MOVING OBJECT DETECTING SYSTEM AND MOVING OBJECT DETECTING METHOD

This application is based on application No. 2004-156363 filed in Japan, the content of which is hereby incorporated by reference.

BACKGROUND OF THE INVENTION

1. Field of the Invention

The present invention relates to a technique for detecting a moving object in a passage.

2. Description of the Related Art

Various techniques have conventionally been proposed for detecting a moving object such as a person in a passage. For example, the following technique has been known for detecting the moving object. Specifically, a slit light beam is irradiated to a predetermined monitoring line, which serves as a subject to be irradiated, along a widthwise direction of the passage, whereupon the vicinity of the monitoring line is repeatedly image-captured at a predetermined time cycle to thereby obtain an image. Then, an image of the slit light beam appearing in the image as an emission line is analyzed to detect the moving object (for example, Japanese Unexamined Patent Publication No. 8-161453, and Japanese Unexamined Patent Publication No. 2001-505006 which is an equivalent to U.S. Pat. No. 6,600,509).

In the above-mentioned detecting technique, when the slit light beam is blocked by the moving object at some position on the monitoring line, a pixel value in the image corresponding to this position is reduced compared to a non-blocked state. Therefore, a difference between a reference value when the slit light beam is non-blocked and the actual pixel value is obtained, and if this difference value is not less than a predetermined judgment threshold value, it can be judged that the slit light beam at the position corresponding to the pixel is blocked. Consequently, a moving object can be detected by considering that a moving object is present at the position where "the slit light beam is judged to be blocked" by this judgment.

However, the slit light beam is reflected on not only the floor surface of the passage but also the surface of the moving object. Therefore, there may be a case where the pixel value corresponding to the blocked state of the slit light beam is increased to approximately the same level as that of the reference value by the reflected light of the slit light beam from the surface of the moving object, depending upon the height or reflectivity of the moving object. In this case, whether the slit light beam is blocked or non-blocked cannot accurately be judged, thereby deteriorating the judging precision.

Further, the judgment threshold value is, in general, the same at all positions on the monitoring line. However, the irradiation intensity of the slit light beam may frequently be non-uniform on the monitoring line. Therefore, whether the slit light beam is blocked or non-blocked cannot accurately be judged depending upon the position on the monitoring line, thereby deteriorating the judging precision.

SUMMARY OF THE INVENTION

The present invention is accomplished in view of the above-mentioned problem, and aims to provide a technique for enhancing judging precision upon judging whether a slit light beam is blocked or non-blocked.

In order to solve the aforesaid problem, in accordance with one aspect of the present invention, there is provided an moving object detecting system for detecting a moving object in a passage, comprising: a light projecting device which irradiates a slit light beam to a line as a subject to be irradiated along a widthwise direction of the passage; a imaging device which image-captures an area including the line to obtain an image; a producing portion which produces, from the image, line data of one-dimensional arrangement of point data corresponding to each position on the line; a judging portion which judges whether the slit light beam is blocked or non-blocked at each position on the line based upon the line data; and a detecting portion which detects the moving object based upon the result of the judgment by the judging portion, wherein, when a direction corresponding to the widthwise direction is defined as a first direction and a direction perpendicular to the first direction is defined as a second direction in the image and the line data, a value of a evaluation function taking each pixel value of a pixel array in the image arranged in the second direction as an argument is rendered by the producing portion to be a value of point data in the line data having the same position as that of the pixel array in the first direction, the evaluation function value depending upon the result of the difference between the pixel values of adjacent pixels in the pixel array.

In accordance with another aspect of the present invention, there is provided a moving object detecting system for detecting a moving object in a passage, comprising: a light projecting device which irradiates a slit light beam to a line as a subject to be irradiated along a widthwise direction of the passage; a imaging device which image-captures an area including the line to obtain an image; a producing portion which produces, from the image, line data of one-dimensional arrangement of point data corresponding to each position on the line; a judging portion that compares corresponding point data values between the reference data corresponding to the line data of when the slit light beam is non-blocked in the whole line and the line data most lately produced, and judges whether the slit light beam at each position on the line is blocked or non-blocked based upon the comparison result; and a detecting portion which detects the moving object based upon the result of the judgment by the judging portion, wherein the comparison result includes a ratio of the other point data value to one point data value of the reference data and the line data.

In accordance with another aspect of the present invention, there is provided a method for detecting a moving object in a passage, comprising steps of: (a) irradiating a slit light beam to a line as a subject to be irradiated along a widthwise direction of the passage as well as for image-capturing an area including the line to thereby obtain an image; (b) producing, from the image, line data of one-dimensional arrangement of point data corresponding to each position on the line; (c) judging whether the slit light beam at each position on the line is blocked or non-blocked based upon the line data; and (d) detecting the moving object based upon the result of the judgment by the step (c), wherein, when the direction corresponding to the widthwise direction is defined as a first direction and the direction perpendicular to the first direction is defined as a second direction in the image and the line data, the value of the evaluation function taking each pixel value of the pixel array in the image arranged in the second direction as an argument is rendered to be a value of point data in the line data having the same position as that of the pixel array in the first direction in the step (b), the evaluation function value depending upon the result of the difference between the pixel values of the adjacent pixels in the pixel array.

In accordance with another aspect of the present invention, there is provided a method for detecting a moving object in a passage, comprising steps of: (a) irradiating a slit light beam to a line as a subject to be irradiated along a widthwise direction of the passage as well as for image-capturing an area including the line to thereby obtain an image; (b) producing, from the image, line data composed of one-dimensional arrangement of point data corresponding to each position on the line; (c) comparing corresponding point data values between the reference data corresponding to the line data of when the slit light beam is non-blocked in the whole line and the line data most lately produced, and judging whether the slit light beam at each position on the line is blocked or non-blocked based upon the comparison result; and (d) detecting the moving object based upon the result of the judgment by the step (c), wherein the comparison result includes a ratio of the other point data value to one point data value of the reference data and the line data.

BRIEF DESCRIPTION OF THE DRAWINGS

These and other objects and features of this invention will become clear from the following description, taken in conjunction with the preferred embodiments with reference to the accompanied drawings in which.

These and other objects and features of this invention will become clear from the following description, taken in conjunction with the preferred embodiments with reference to the accompanied drawings in which.

DETAILED DESCRIPTION OF THE PREFERRED EMBODIMENTS

An embodiment of the present invention will be explained hereinbelow with reference to the drawings.

1. Construction

Figure 1:
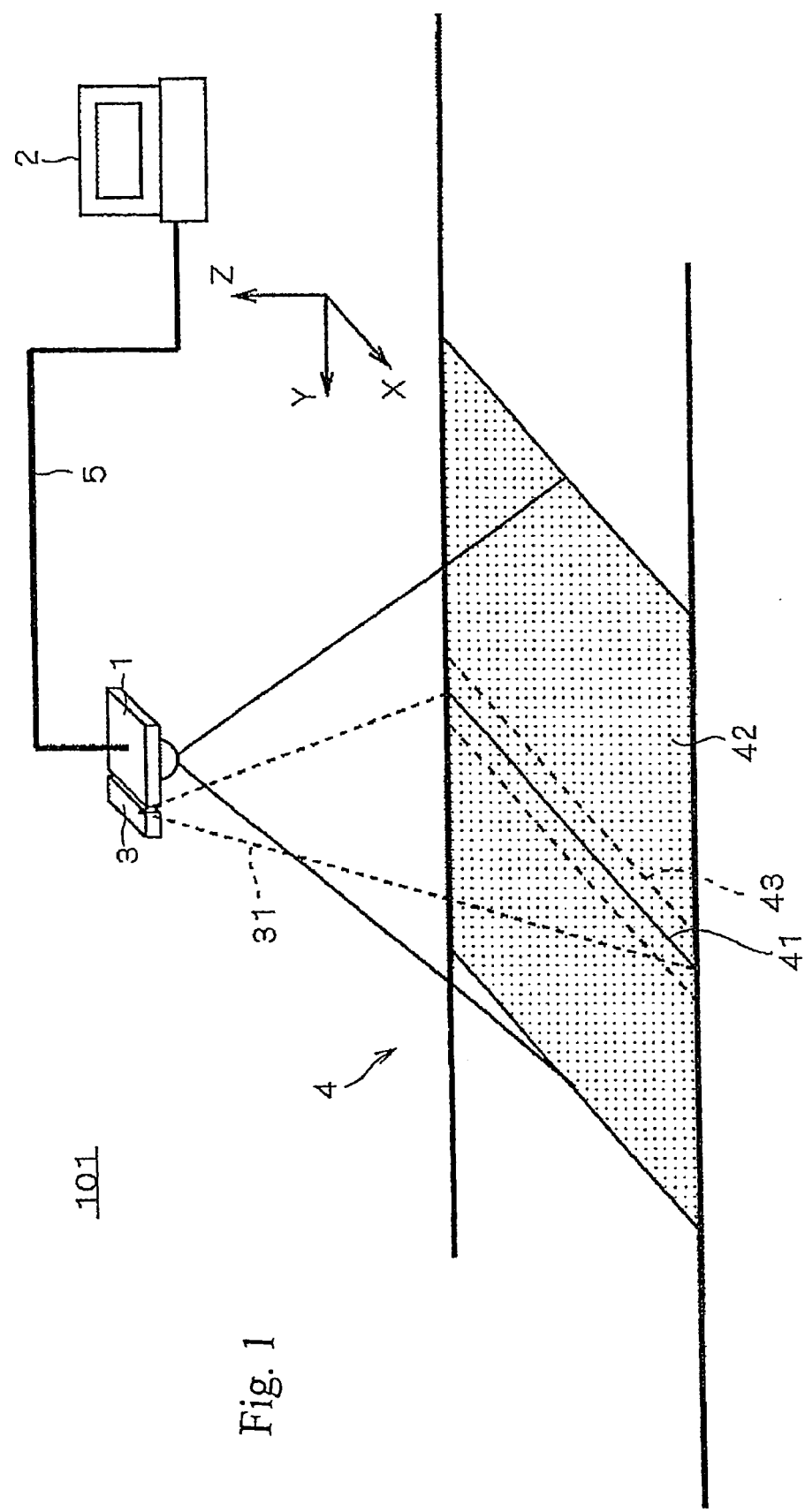
FIG. 1 is a schematic constructional drawing of a moving object detecting system of an embodiment according to the present invention.

FIG. 1 is a schematic constructional drawing of a moving object detecting system according to an embodiment of the present invention. This moving object detecting system 101 detects a moving object that blocks a slit light beam 31 in a passage 4 and counts the passing number of the moving object. In this embodiment, the moving object to be detected is a person.

As shown in the figure, the moving object detecting system 101 has a light projecting device 3 that irradiates the slit light beam 31, an imaging device 1 that image-captures the position where the slit light beam 31 is irradiated, and a monitoring device 2 that displays the counting result or the like based upon the image-captured image. It should be noted that a three-dimensional XYZ rectangular coordinate axis is suitably used for representing a direction in the following explanation. This XYZ axis is relatively fixed to the passage 4, wherein the X-axis direction is the widthwise direction of the passage 4, the Y-axis direction is a direction in which the passage 4 advances and the Z-axis direction is the vertical direction.

In the moving object detecting system 101, a line 41 that is a line segment having a length equal to the width of the passage 4 and along the widthwise direction (X-axis direction) of the passage 4 is virtually set on the floor surface of the passage 4. A person(s) present on this line 41 is detected and the number of the detected persons is counted as a passing number on the passage 4. This line 41 is referred to as a "monitoring line" 41 hereinbelow. The monitoring line 41 is only a virtually set line, which means that an actually visible line is not present at this position.

The light projecting device 3 has a light source inside and a light projecting optical system that forms the light from the light source into a slit light beam that is long, slender light having a long axis and a short axis. This light projecting device 3 projects the slit light beam 31 via the light projecting optical system. The light projecting device 3 is mounted above the space where the moving object passes, e.g., at a ceiling above the passage 4, such that the optical axis of the light projecting optical system is directed toward an approximately vertical direction (Z-axis direction). The slit light beam 31 is irradiated to the monitoring line 41 that serves as a subject to be irradiated, whereby its long axis is along the widthwise direction (X-axis direction) of the passage 4. An infrared ray that is an invisible light beam is used as the slit light beam 31 in order that a person, that is a moving object to be detected, is not aware of being detected.

Like the light projecting device 3, the imaging device 1 is mounted above the space where the moving object passes, e.g., at a ceiling above the passage 4, so as to be adjacent to the light projecting device 3. The imaging device 1 repeatedly image-captures an area 42 including the monitoring line 41 at a predetermined time cycle from its mounted position. The optical axis of an imaging optical system of the imaging device 1 is directed toward an approximately vertical direction (Z-axis direction). The imaging device 1 detects a person based upon plural time-series images obtained successively with time by this image-capture and counts the passing number.

The monitoring device 2 is a typical computer provided with a CPU, memory, hard disk, display and the like. The monitoring device 2 is arranged in a monitor room or the like that is apart from the passage 4. The passing number of persons counted by the imaging device 1 is transmitted to the monitoring device 2 via a transmission cable 5. The monitoring device 2 displays information such as the passing number of persons transmitted from the imaging device 1. It should be noted that the data communication system from the imaging device 1 to the monitoring device 2 is not limited to a wire system, but may be a wireless system.

Figure 2:
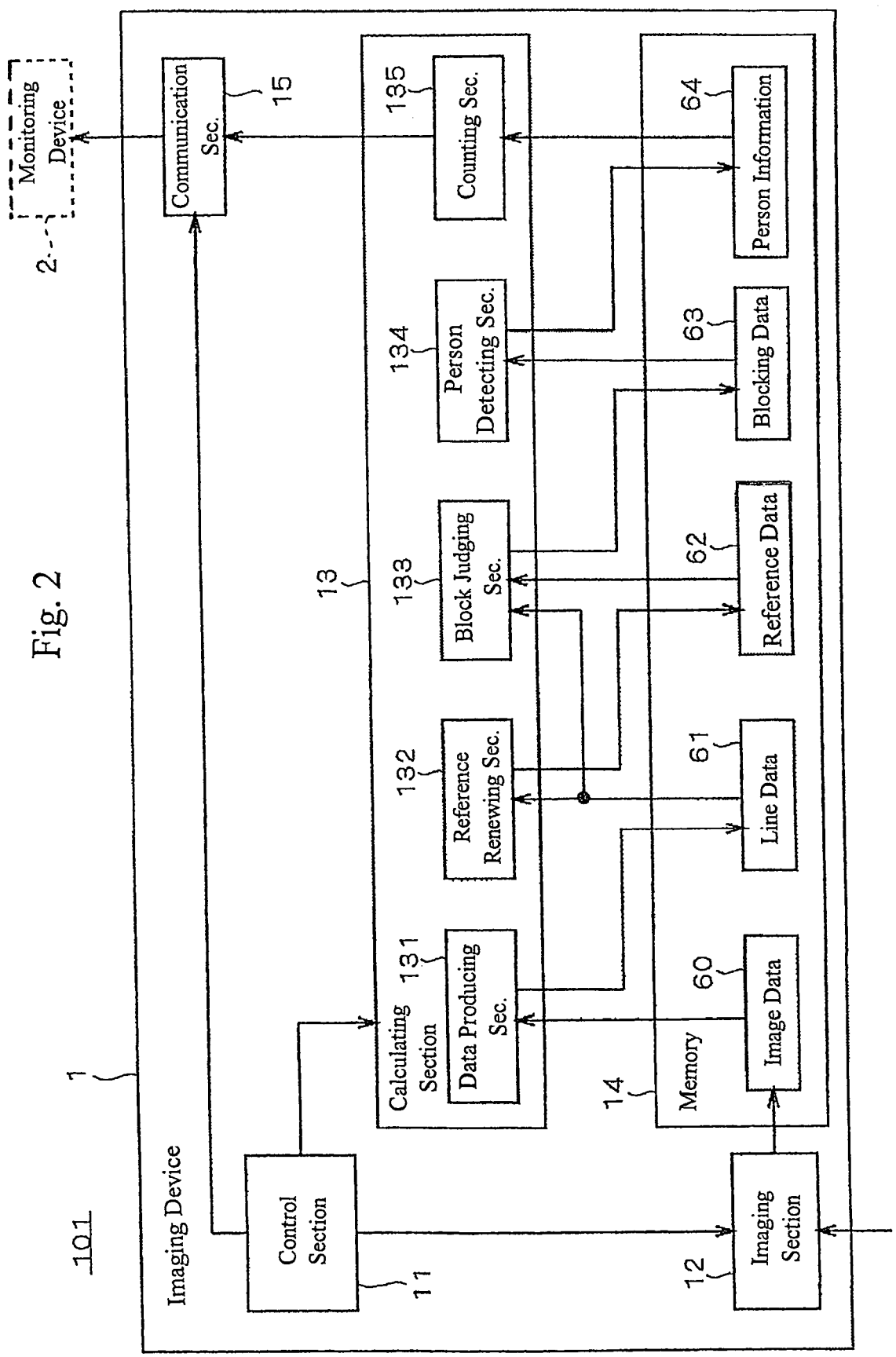
FIG. 2 is a drawing showing a main functional construction of an imaging

FIG. 2 is a drawing showing a main functional construction of the imaging device 1. As shown in FIG. 2, the imaging device 1 has a control section 11 for controlling the entire device, an imaging section 12 for obtaining an image, a calculating section 13 for performing various calculations, a memory 14 that is an operation area of the calculations, and a communication section 15 for performing data communication to the monitoring device 2.

The control section 11 includes a microcomputer having a CPU, RAM, ROM and the like. It is electrically connected to each of the imaging section 12, calculating section 13 and communication section 15 for controlling the operation at each section in a supervisory manner. Further, the control section 11 also has a function as a timer for counting how much time has elapsed from a given point in time.

The imaging section 12 performs an image-capture to obtain a two-dimensional image and has an imaging optical system for imaging the incident light, an imaging element such as a CCD for photoelectrically converting the formed optical image into a signal charge, and an A/C converter for converting the signal charge that is an analog signal into a digital signal. A band-pass filter that transmits only a waveband (infrared waveband) of the slit light beam 31 is mounted to the imaging optical system, which is an incident path of the incident light, such that the imaging element effectively receives the reflected light of the slit light beam 31. It should be noted that such band-pass filter may be adopted for an on-chip filter on the imaging element.

The calculating section 13 includes an electric circuit to have various calculation functions. These functions of the calculating section 13 enable detection of a person based upon the image obtained by the imaging section 12 and counting of its passing number. In FIG. 2, data producing section 131, reference renewing section 132, block judging section 133, person detecting section 134 and counting section 135 schematically represent the functions provided at the calculating section 13 respectively. It should be noted that these functions of the calculating section 13 may be realized by a software (i.e., by performing a calculation by the CPU or the like according to a program).

2. Processing

Figure 3:
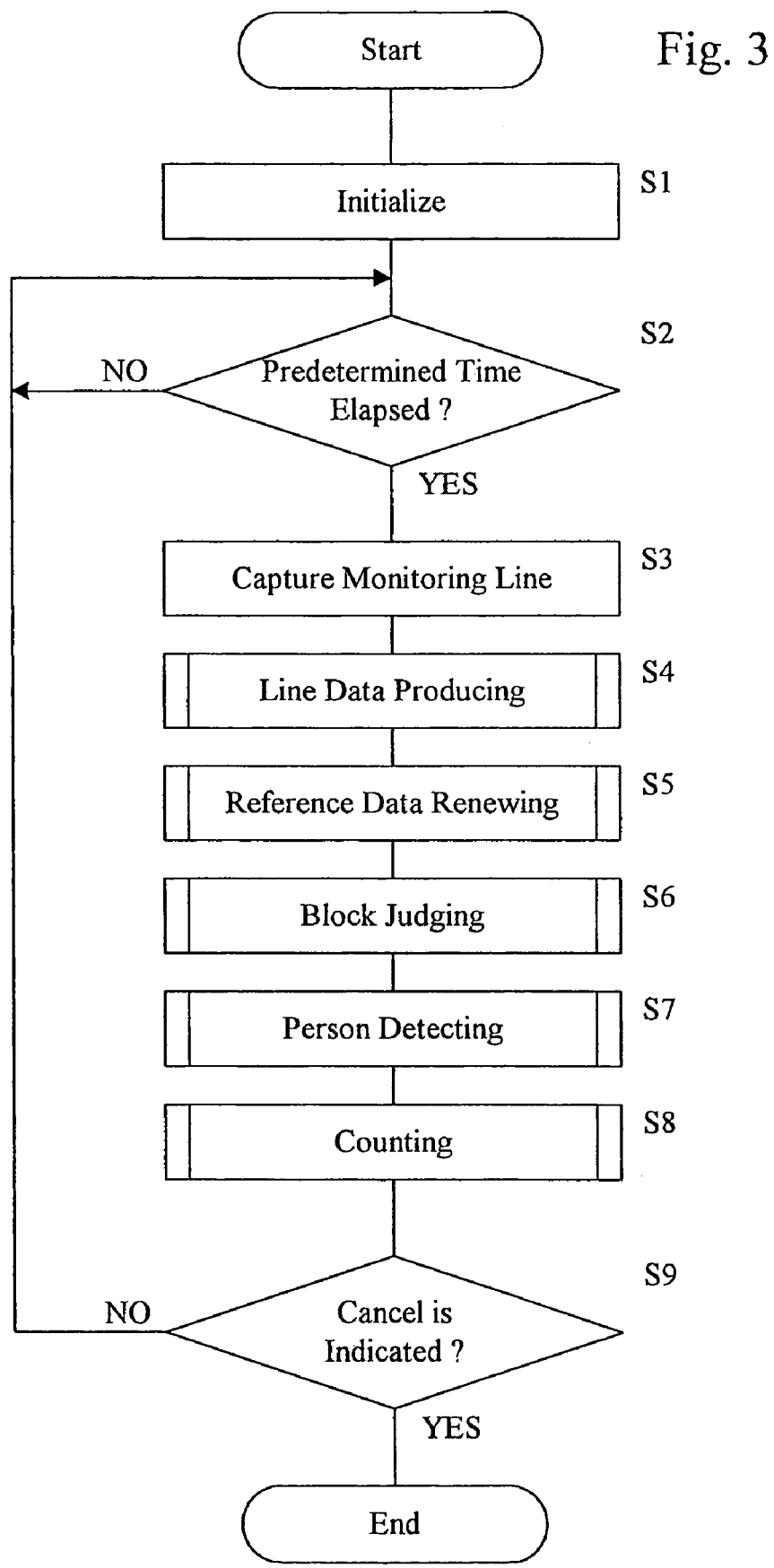
FIG. 3 is a drawing showing a basic process flow of the imaging device.

FIG. 3 is a drawing showing a flow of a basic process of the imaging device 1 in the moving object detecting system 101. Firstly, an outline of the process of the imaging device 1 will be explained hereinbelow with reference to FIGS. 2 and 3, and then, the detail of each process will be explained.

When the imaging device 1 is started, an initialization is performed in the beginning to detect a moving object in the passage 4. Specifically, data in the memory 14 is cleared and the counting is started by the control section 11. Further, in synchronous with the initialization of the imaging device 1, the slit light beam 31 is started to be irradiated to the monitoring line 41 from the light projecting device 3 (step S1).

Until the cancel of the process is indicated after that (during No at step S9), the processes at steps S3 to S8 are executed every predetermined time based upon the counted time at the control section 11 (Yes at step S2). The processes at steps S3 to S8 thus repeated are hereinafter referred to as "routine process". The time cycle for repeating the routine process is set to, for example, 1/30 (second).

In the routine process, the area 42 including the monitoring line 41 is image-captured by the imaging section 12, and then, the obtained image is stored in the memory 14 as image data 60. The pixel value, which is a value of each pixel in the image data 60, represents the intensity of the infrared ray reflected by the subject. For example, it is expressed by 8 bits (0 to 255). On the subject, the pixel value of the pixel corresponding to the position where the slit light beam 31 is irradiated (the position where the slit light beam 31 is reflected) becomes relatively great, while the pixel value of the pixel corresponding to the position where the slit light beam 31 is not irradiated becomes relatively small. Accordingly, the image of the slit light beam 31 (hereinafter referred to as a "slit optical image") appears as an emission line in the image data 60 (step S3).

Subsequently, line data 61 of one-dimensional arrangement of point data corresponding to each position on the monitoring line 41 is produced from the image data 60 by the data producing section 131 (line data producing process). The point data of the line data 61 represents the irradiated state of the slit light beam 31 at the corresponding position at this time (step S4).

Subsequently, reference data 62 showing a state of the monitoring line 41 in a case where the moving object is not present in the passage 4 is renewed by the reference renewing section 132 by using a predetermined number of line data 61 most lately produced (reference data renewing process). The reference data 62 has the same data structure as the line data 61, and substantially corresponds to the line data of when the slit light beam 31 is not blocked all over the monitoring line 41. The reference data 62 is stored in advance in the memory 14 and repeatedly renewed at a predetermined time cycle (step S5).

Then, the block judging section 133 compares the corresponding point data between the line data 61 and the reference data 62, whereby whether the slit light beam 31 at each position is blocked or non-blocked is judged based upon the result of the comparison (block judging process). The judging result at every position on the monitoring line 41 obtained by this block judging process is arranged into blocking data 63 of one-dimensional arrangement of the point data corresponding to each position (step S6).

Subsequently, a person is detected by the person detecting section 134 based upon the blocking data 63 (person detecting process). More specifically, information on the position where a person is present on the monitoring line 41 is obtained as person information 64 (step S7). Then, the number of persons-passing on the monitoring line 41 is counted based upon the person information 64 by the counting section 135 (counting process) (step S8). A series of routines is completed as described above, so that the process is returned to the step S2.

2-1. Line Data Producing Process

Figure 4:
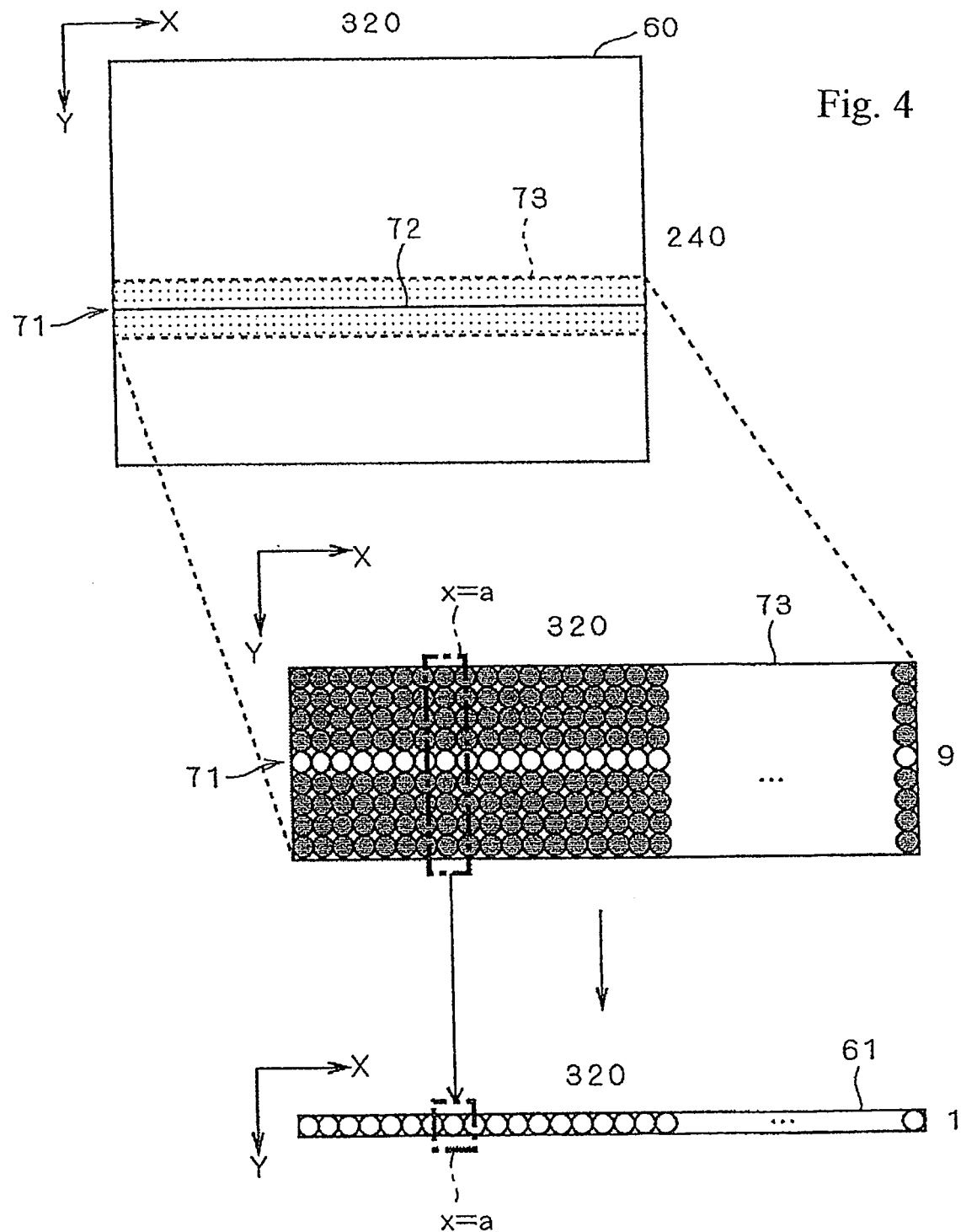
FIG. 4 is a drawing conceptionally showing a content of a line data producing process.

Subsequently explained is a detail of the line data producing process by the data producing section 131 (FIG. 3:

step S4). FIG. 4 is a drawing conceptionally showing the content of the line data producing process.

As shown in the figure, the image data 60 obtained by the imaging section 12 has 320 pixels (width)×240 pixels (height). The image data 60 includes the image 71 of the monitoring line 41 (hereinafter referred to as a "monitoring line image") along the widthwise direction. Therefore, the widthwise direction of the image data 60 corresponds to the X-axis direction of the subject (widthwise direction of the passage 4), while the longitudinal direction thereof corresponds to the Y-axis direction of the subject (the direction in which the passage 4 advances).

It should be noted that, in the following explanation, two-dimensional XY coordinates are set in the image data 60, wherein the direction in the image data 60 is expressed as the same direction of the subject corresponding to the direction in the image data 60. Specifically, the widthwise direction of the image data 60 is defined as the X-axis direction (the rightward direction is plus-direction) and the longitudinal direction is defined as the Y-axis direction (the downward direction is plus-direction). Similarly, the one-dimensional X-coordinate is set for the line data 61, reference data 62 and blocking data 63, since they correspond to the X-axis direction in which the monitoring line 41 extends. The origin of the X-coordinate is set at the left end of the data (the rightward direction is plus-direction), wherein each point data is discriminated by the coordinate position x concerning the X-coordinate.

Since the slit light beam 31 is irradiated toward the monitoring line 41, the image 72 of the slit light beam 31 (hereinafter referred to as "slit optical image") appearing in the image data 60 ideally agrees with the monitoring line image 71 when the whole slit light beam 31 is in the non-blocked state. Considering the case where the slit light beam 31 is somewhat deviated from the monitoring line 41 due to the error in installation or the like, the subject to be evaluated in this embodiment is an area 73 in the image data 60 including the monitoring line image 71 and having widths in both the Y-axis plus-direction and minus-direction from the monitoring line image 71. The line data 61 is produced from this area 73 (hereafter referred to as an "evaluation area"). The evaluation area 73 is an image of the area 43 including the monitoring line 41 on the floor surface on the passage 4 in FIG. 1. Each pixel in the evaluation area 73 is discriminated by the coordinates (x, y) on the XY-coordinate having the origin set at the upper left end.

In this embodiment, the evaluation area 73 has 320 pixels in width and 9 pixels in length, having 320 pixel arrays arranged in the Y-axis direction. One piece of point data of the line data 61 is produced for every these pixel arrays. The value of the point data of x=a in the line data 61 is obtained based upon nine pixel values included in the pixel array of x=a in the evaluation area 73. Obtaining the point data value in the line data 61 as described above is similarly performed for all X coordinates. Therefore, the line data 61 is composed of point data of 320 in width and 1 in length.

Supposing that the value of some point data in the line data 61 is P and nine pixel values of one pixel array (hereinafter referred to as a "target pixel array") arranged in the Y-axis direction for obtaining the value P are defined as V1, V2 ... V9 in the order from the minus-direction of the Y-axis, the point data value P can be represented by the following formula (1).

Formula 1

$$P = f(V_1, V_2, \ldots, V_9) \quad (1)$$

Specifically, the point data value P in the line data 61 takes a value of a function f having nine pixel values Vy (y=1, 2, ..., 9) included in the target pixel array as an argument. This function f is referred to as an "evaluation function" hereinbelow.

The line data 61 is required to clearly indicate the irradiation state of the slit light beam 31 at the position corresponding to each point data, since the line data 61 is used for the later-performed block judging process. More specifically, it is required that there is a clear difference between the point data value in the state where the slit light beam 31 at the corresponding position is blocked and the point data value in the state where it is non-blocked. In this embodiment, it is necessary that the point data value of the blocked state is clearly lower than that of the non-blocked state.

Therefore, the considered technique is that the following formula (2) is adopted as an arithmetic expression of the evaluation function f and the point data value P in the line data 61 takes the maximum value among nine pixel values V1, V2, ... V9 included in the target pixel array (hereinafter referred to as a "maximum value selecting method"). Specifically, the pixel value in the evaluation area 73 is used as it is for the point data value in the line data 61 in the "maximum value selecting method".

Formula 2

$$P = \max[V_1, V_2, \ldots V_9] \quad (2)$$

Wherein "max" is the maximum value in [ ].

However, this embodiment does not adopt the "maximum value selecting method", but adopts a technique depending upon the result of the difference between the pixel values of the adjacent pixels in the target pixel array (hereinafter referred to as an "adjacent pixel difference method"). Specifically, the following formula (3) or (4) is adopted as an arithmetic expression of the evaluation function f.

Formula 3

$$P = \max[d(2), d(3), \ldots d(8)] \quad (3)$$

Wherein $d(y) = V_y \cdot 2 - V_{y-1} - V_{y+1}$ and "max" is the maximum value in [ ].

Formula 4

$$P = \sum_{y=1}^{8} |V_y - V_{y+1}| \quad (4)$$

In a case where the arithmetic expression (3) is adopted, a secondary differential value d(y) is obtained for each pixel in the target pixel array (except for end pixels satisfying y=1, 9) and the maximum value among the obtained seven values d(y) (y=2, 3, ... 8) becomes the value of the evaluation function f. On the other hand, in a case where the arithmetic expression (4) is adopted, the total sum of the contrast in the target pixel array becomes the value of the evaluation function f The difference calculation (the following formula (5)) of the pixel values at the respective adjacent pixels in the target pixel array is included in the arithmetic expression in the cases of using either arithmetic expression. Therefore, the point data value P in the line data 61 expressed as the value of the evaluation function f depends upon the result of the difference between the pixel values of the adjacent pixels.

Formula 5

$$V_{\gamma - \nu_{\gamma+1}} \quad (5)$$

As described above, the embodiment of the present invention does not adopt the "maximum value selecting method" but adopts the "adjacent pixel difference method" upon obtaining the point data value in the line data 61. The following explanation is made about the problem when the "maximum value selecting method" is adopted.

Figure 5:
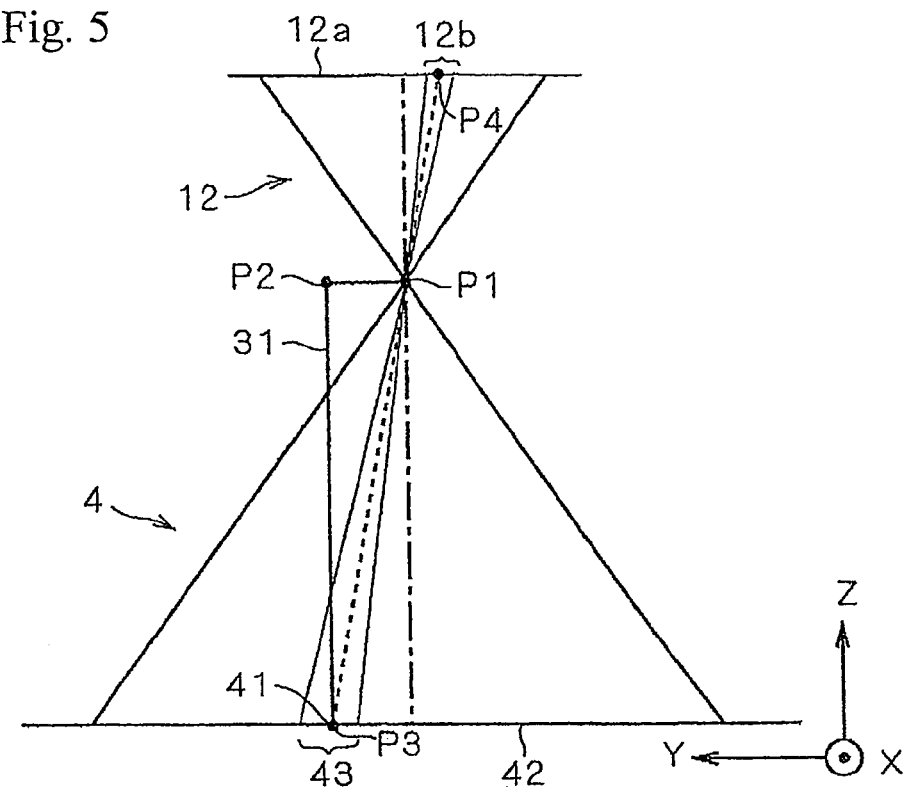
FIG. 5 is a drawing showing a state seen from a plus-direction of an X-axis direction of a passage.
Figure 6:
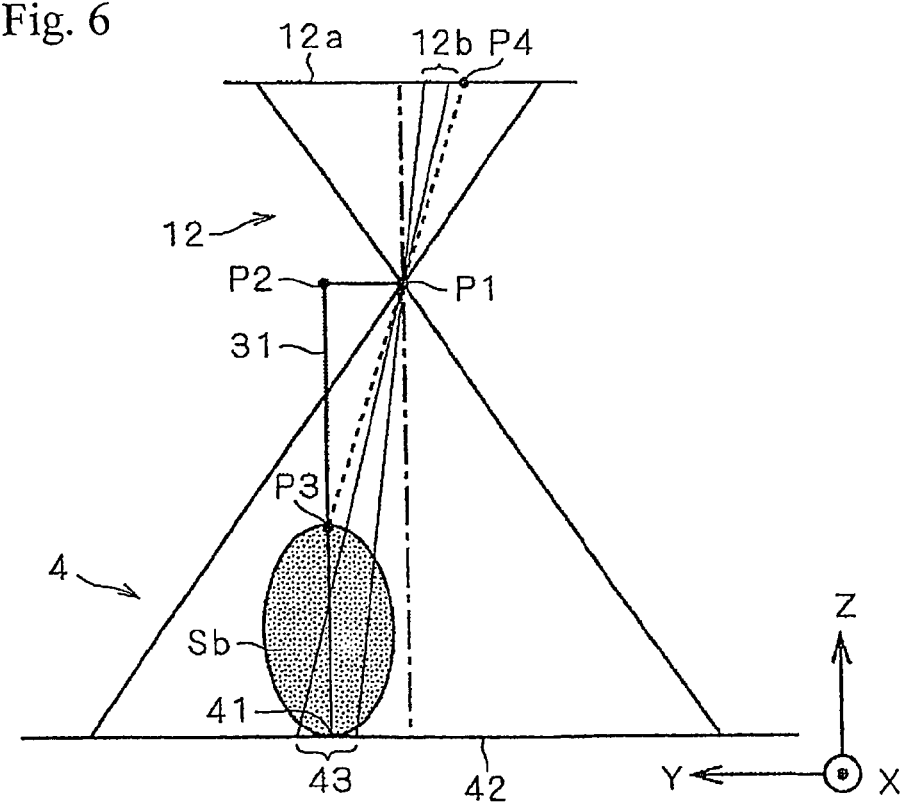
FIG. 6 is a drawing showing a state seen from a plus-direction of an X-axis direction of a passage.
Figure 7:
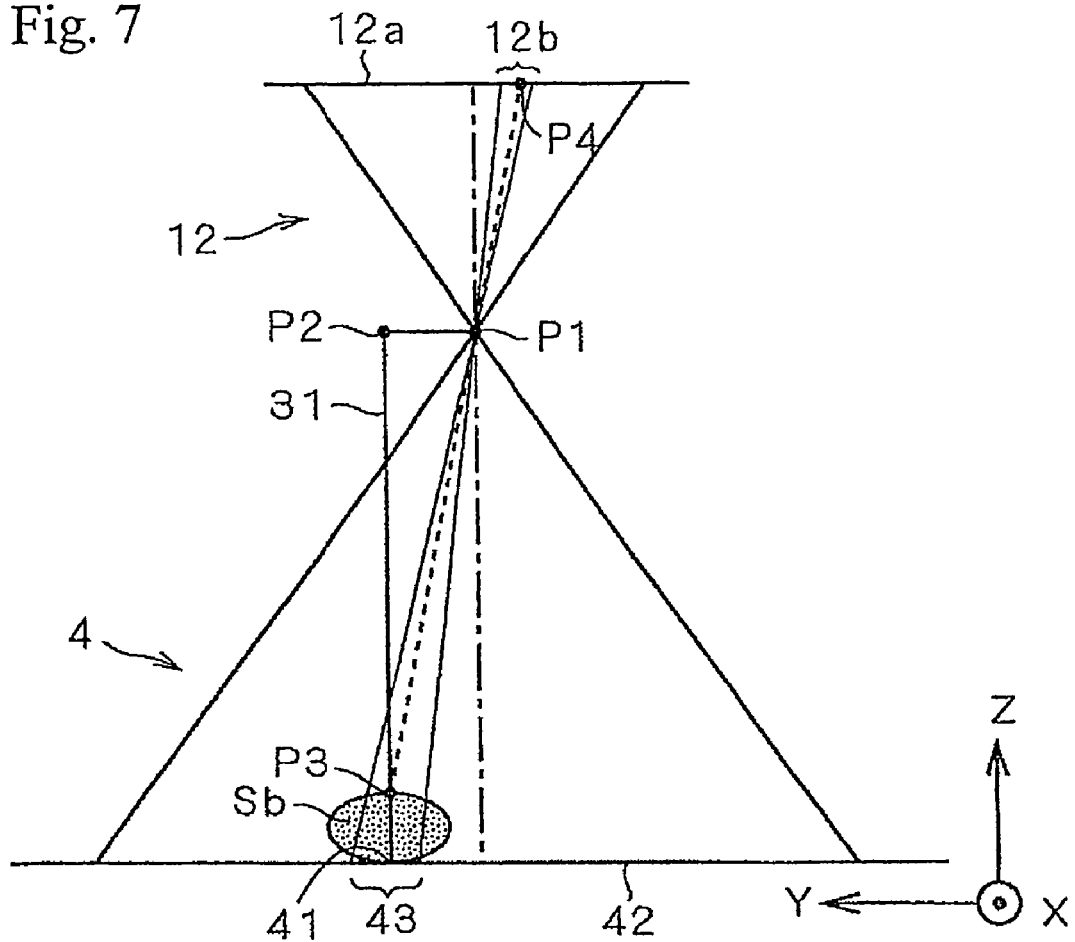
FIG. 7 is a drawing showing a state seen from a plus-direction of an X-axis direction of a passage 4.

FIGS. 5 to 7 respectively show a state from the plus-direction of the X-axis of the passage 4. FIG. 5 shows a case where a moving object Sb is not present, FIG. 6 shows a case where a relatively high moving object blocks the slit light beam 31 and FIG. 7 shows a case where a relatively low moving object Sb blocks the slit light beam 31.

Further, the section above the point P1 in the figure is schematically shown wherein the structure of the imaging section 12 is replaced with the structure of a pinhole camera. The point P1 corresponds to an eye point (pinhole position of the pinhole camera) of the imaging optical system in the imaging section 12 and a surface 12a represents a light-receiving surface of the imaging element in the imaging section 12 (i.e., image-forming surface by the imaging optical system). Moreover, an area 12b shown on the light-receiving surface 12a corresponds to an area where the light reflected from the area 43 on the passage 4 is focused to form an image, i.e., corresponds to the evaluation area 73 in the image data 60.

Further, the point P2 indicates a light projection starting point of the slit light beam 31 by the light projecting device 3. In a case where the moving object Sb does not block the slit light beam 31 as shown in FIG. 5, the slit light beam 31 projected from the light projecting device 3 is reflected on a point P3 on the monitoring line 41 that is the floor surface of the passage 4. The image of the point P3 is formed on a point P4 in the area 12b on the light-receiving surface 12a. This enables obtaining the image data 60 shown in the upper section in FIG. 4.

Figure 8:
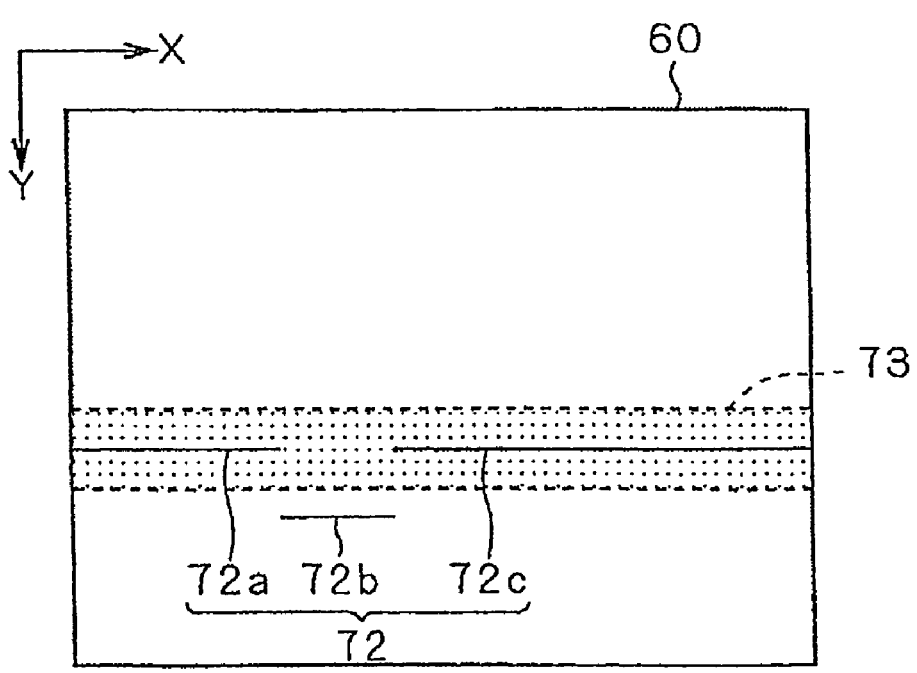
FIG. 8 is a drawing showing one example of a slit optical image in image data.

Further, in a case where the relatively high moving object Sb blocks the slit light beam 31 as shown in FIG. 6, the slit light beam 31 is reflected on the point P3 at the upper section of the moving object Sb. This point P3 is not included in the space formed by the point P1 and the area 43, so that the image of the point P3 is formed on the point P4 that is outside of the area 12b on the light-receiving surface 12a. Accordingly, in the image data 60, a slit optical image 72b in the blocked state is positioned at the outside of the evaluation area 73 and only a slit optical image 72a in the non-blocked state is positioned in the evaluation area 73 as shown in FIG. 8. When the point data value in the line data 61 is obtained by the "maximum value selecting method" in this case, the slit optical image 72b is unrelated to the point data value corresponding to the blocked state. Therefore, the point data value becomes low when corresponding to the blocked state while it becomes high when corresponding to the non-blocked state.

Figure 9:
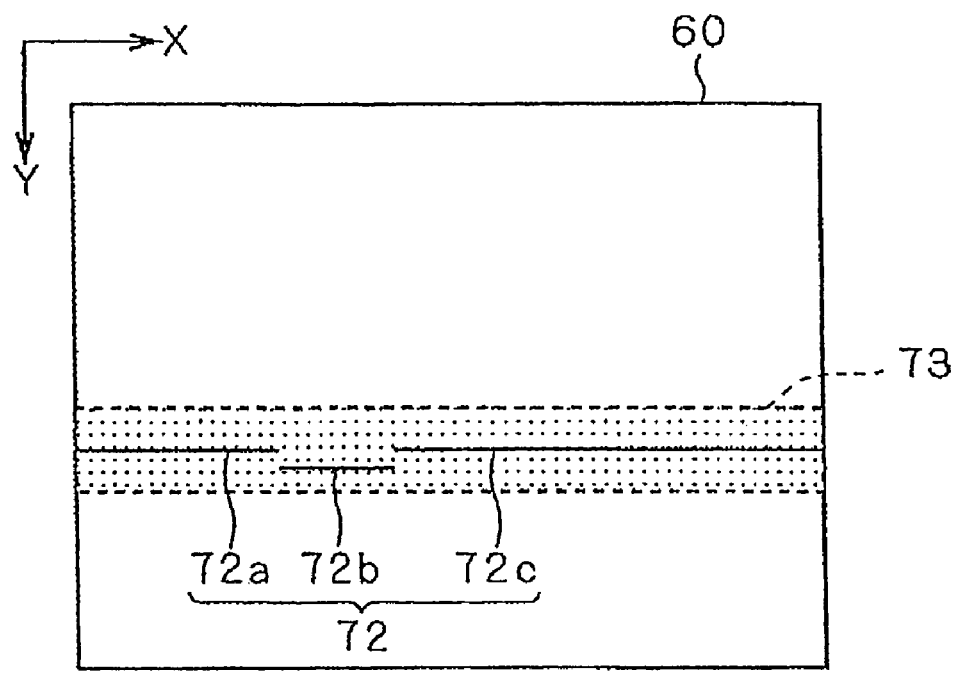
FIG. 9 is a drawing showing one example of a slit optical image in image data.

On the other hand, in a case where the relatively low moving object Sb blocks the slit light beam 31, the slit light beam 31 is reflected on the point P3 at the upper section of the moving object P3. However, this point P3 is included in the space formed by the point P1 and the area 43 when the moving object Sb is low, so that the image of the point P3 is formed on the point P4 in the area 12b on the light-receiving surface 12a. Accordingly, in the image data 60, the slit optical image 72b in the blocked state is positioned in the evaluation area 73 as shown in FIG. 9.

Therefore, when the point data value in the line data 61 is obtained by the "maximum value selecting method" in this case, the intensity of the slit optical image 72b is reflected on the point data value corresponding to the blocked state. Further, when the reflectivity of the infrared ray on the moving object Sb is equal to that on the floor surface of the passage 4 in this case, there is no clear difference between the point data value corresponding to the blocked state and the point data value corresponding to the non-blocked state, with the result that the condition required for the point data value is not satisfied.

Adopting the "maximum value selecting method" entails a problem in the case where a low moving object having high reflectivity (hereinafter referred to as a "specific moving object") blocks the slit light beam 31 as described above. This embodiment adopts the "adjacent pixel difference method" such that there is a clear difference between the point data value corresponding to the blocked state and the point data value corresponding to the non-blocked state even in the case where the specific moving object described above blocks the slit light beam 31.

Explained hereinbelow is a principle wherein the above-mentioned problem is eliminated by adopting the "adjacent pixel difference method". This principle is based upon the fact that the distribution of the slit optical image 72 in the Y-axis direction is different between the case where the slit light beam 31 is reflected on the floor surface of the passage 4 and the case where the slit light beam 31 is reflected on the surface of the moving object.

Figure 10:
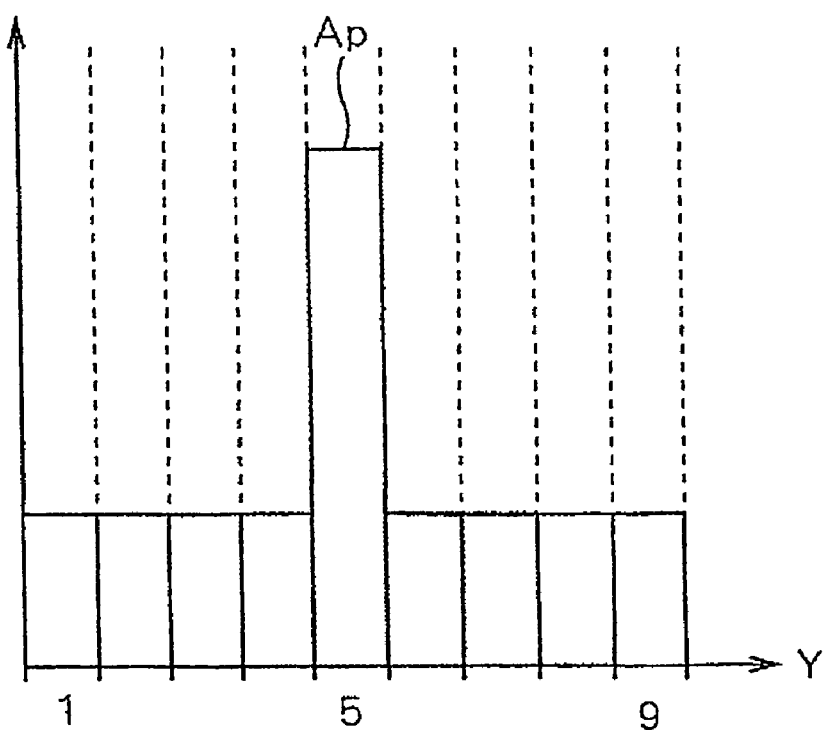
FIG. 10 is a drawing showing a pixel value of each pixel in a target pixel array.
Figure 11:
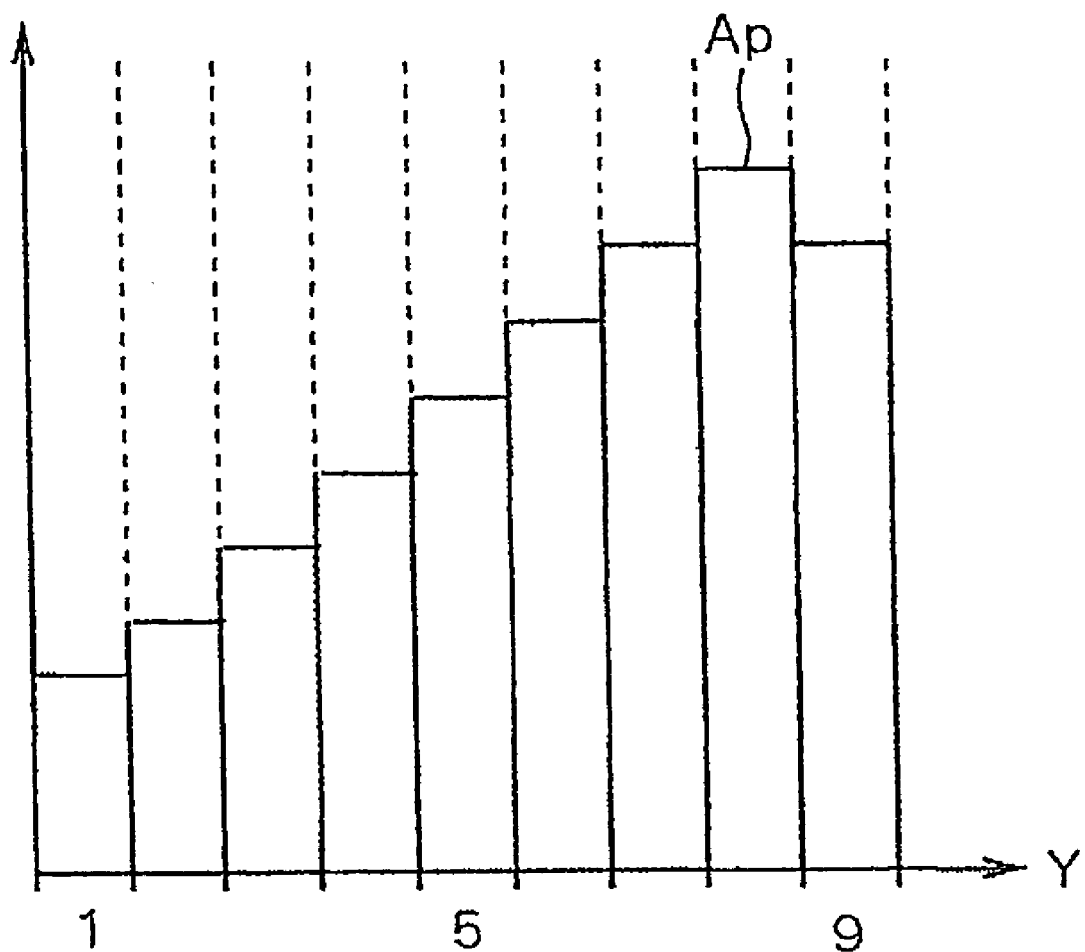
FIG. 11 is a drawing showing a pixel value of each pixel in a target pixel array.
Figure 12:
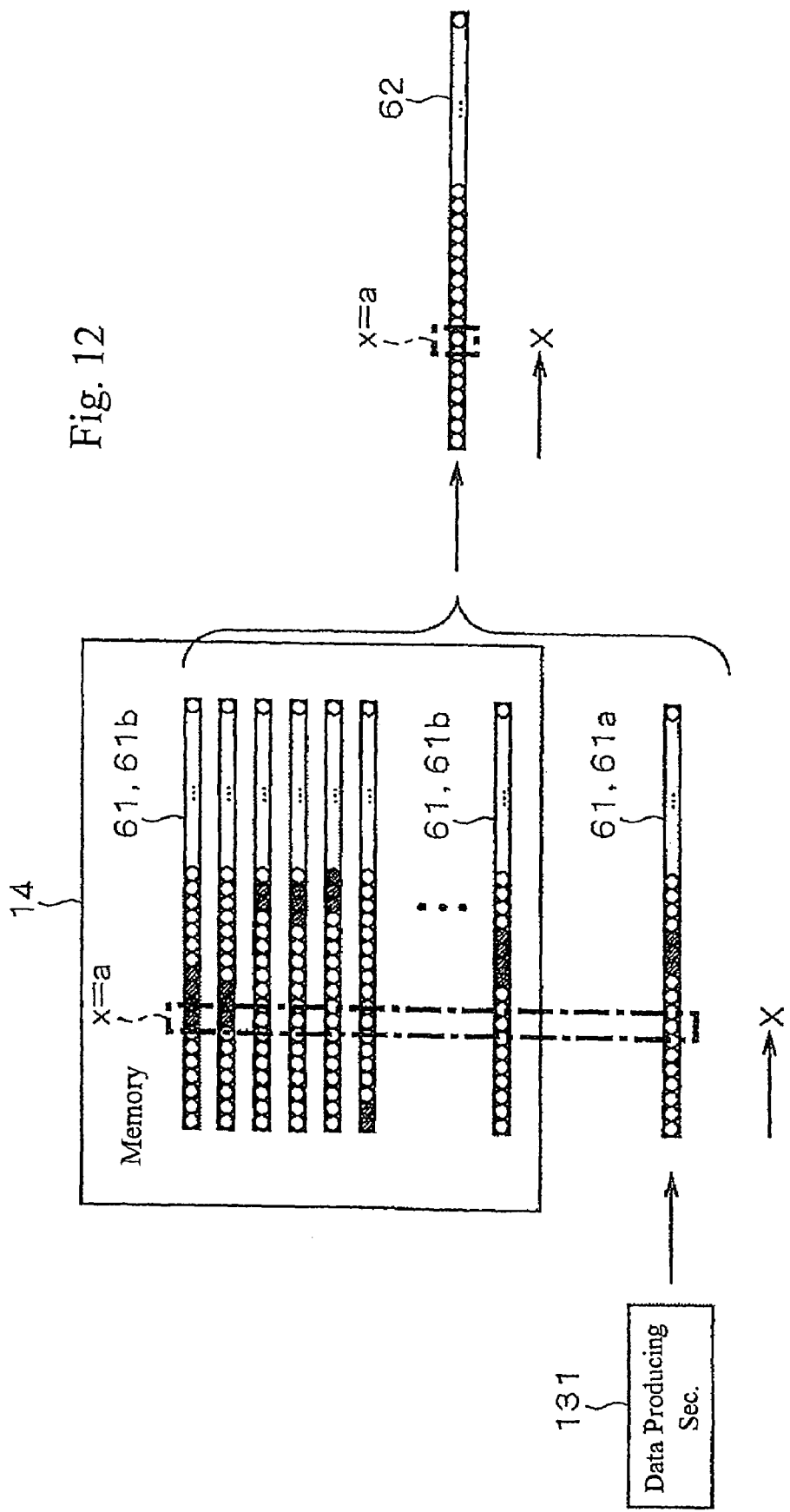
FIG. 12 is a drawing conceptionally showing a content of a reference data renewing process.

FIGS. 10 and 11 respectively show a pixel value of each pixel in the target pixel array. FIG. 10 shows the case where the slit light beam 31 is reflected on the floor surface of the passage 4, while FIG. 11 shows the case where the slit light beam 31 is reflected on the moving object.

In the case where the slit light beam 31 is reflected on the floor surface of the passage 4 as shown in FIG. 10, the slit optical image 72 almost appears only on one pixel (hereinafter referred to as a "pixel of interest") Ap on which the slit light beam 31 is mainly imaged. Therefore, the difference between the pixel value of the pixel of interest Ap and the pixel value of the other pixels increases in the target pixel array.

On the other hand, in the case where the slit light beam 31 is reflected on the surface of the moving object, a great diffuse reflection occurs upon the reflection as shown in FIG. 11, so that the slit optical image 72 appears not only on the pixel of interest Ap but also on its peripheral pixels. Therefore, the pixel value is decreased in a stepwise manner from the pixel of interest Ap to its peripheral pixels in the target pixel array.

Accordingly, when the difference calculation is performed of the pixel values at the adjacent pixels in the case of FIG. 10, any one result of the difference takes a relatively great value. On the other hand, when the difference calculation is performed of the pixel values at the adjacent pixels in the case of FIG. 11, the pixel values are offset between the adjacent pixels, whereby all results of the difference take a relatively small value. Specifically, adopting the "adjacent pixel difference method" makes it possible to increase the point data value when the slit light beam 31 is reflected on the floor surface of the passage 4 and to decrease the point data value when the slit light beam 31 is reflected on the surface of the moving object.

According to the above-mentioned principle, adopting the "adjacent pixel difference method" makes it possible to decrease the point data value corresponding to the blocked state of the slit light beam 31 even in the case where the specific moving object blocks the slit light beam 31. Consequently, the point data value in the line data 61 in this embodiment becomes low when corresponding to the blocked state and high when corresponding to the non-blocked state in any case. As a result, the point data value corresponding to the blocked state is clearly different from the point data value corresponding to the non-blocked state, thereby enhancing the judging precision for judging whether the slit light beam 31 is blocked or non-blocked in the later-performed block judging process.

2-2. Reference Data Renewing Process

Subsequently explained in detail is the reference data renewing process (FIG. 3: step 5) by the reference renewing section 132.

As described above, one piece of line data 61 is newly produced in every routine process shown in FIG. 3, wherein the routine process is repeated at a predetermined time cycle, so that plural pieces of line data 61 are time-sequentially produced. The reference data 62 is produced based upon the plural pieces of line data 61 time-sequentially produced as described above.

In this embodiment, most lately produced 64 pieces of line data 61 are utilized for producing the reference data 62. More specifically, the reference data 62 is produced based upon a piece of line data (most lately produced line data) 61a produced by the data producing section 131 in the last-time line data producing process and 63 pieces of line data 61b that are produced in the past line data producing process before the last-time process and stored in the memory 14.

The point data in the reference data 62 is produced based upon 64 point data values having the same X coordinates in 64 pieces of line data 61. Specifically, the point data value of x=a in the reference data 62 is obtained from each point data value of x=a in 64 pieces of line data 61. Obtaining the point data value in the reference data 62 described above is similarly performed relating to all X coordinates. Therefore, the reference data 62 is also composed of the point data of 320 in width and 1 in length like the line data 61.

Supposing that some point data value in the reference data 62 is defined as Q and 64 point data values for obtaining the value Q are defined as P1, P2, ..., P64, the point data value Q is expressed by the following formula (6). Specifically, the point data value Q in the reference data 62 takes the maximum value among 64 pieces of point data P1, P2, ... P64 most lately produced in the past.

Formula 6

$$Q = \max[P_1, P_2, \ldots P_{64}] \quad (6)$$

Wherein "max" is the maximum value in [ ].

Any one piece of point data in the respective 64 pieces of line data 61 may correspond to the blocked state. However, when attention is made on 64 pieces of point data having the same X coordinates in the line data 61, it is considered that any one of 64 pieces of point data corresponds to the non-blocked state. Therefore, the maximum value among the values of the 64 pieces of point data can be a value corresponding to the non-blocked state. Accordingly, performing the calculation represented by the formula (6) for all X coordinates enables producing the reference data 62 corresponding to the line data 61 wherein all pieces of point data correspond to the non-blocked state. The reference data 62 thus produced is rewritten to renew the reference data 62 in the memory 14.

Since the reference data 62 is produced from 64 pieces of line data 61 most lately produced, it shows the intensity of the infrared ray on the monitoring line 41 at this time. Specifically, even when the intensity of the environmental light irradiating the monitoring line 41 changes, the reference data on which this change is reflected can be produced. Therefore, using such reference data 62 for the block judging process makes it possible to judge whether the slit light beam 31 is blocked or non-blocked considering the change in the intensity of the environmental light.

Further, each of 64 pieces of line data 61 is produced by the above-mentioned "adjacent pixel difference method", so that the point data value corresponding to the blocked state of the slit light beam 31 cannot be great, in any case, compared to the point data value corresponding to the non-blocked state. Accordingly, accurate reference data 62 can be obtained. As a result, the judging precision for judging whether the slit light beam 31 is blocked or non-blocked is enhanced in the block judging process.

It is unnecessary to perform the reference data renewing process for every routine process. For example, it may be performed once every predetermined number, such as 64 or 8, of routine processes.

2-3. Block Judging Process

Figure 13:
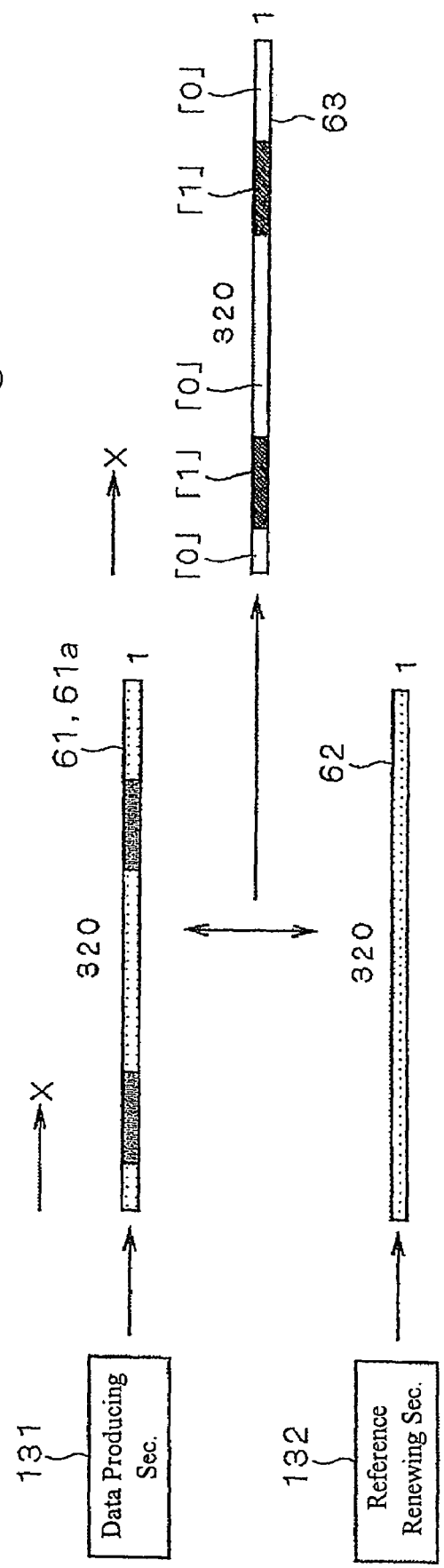
FIG. 13 is a drawing conceptionally showing a content of a block judging process.

Subsequently, the detail of the block judging process by the block judging section 133 (FIG. 3: step S6) will be explained. FIG. 13 conceptually shows the content of the block judging process.

In the block judging process, the point data values having the same X coordinates are compared to each other between the line data 61 (61a) most lately produced by the data producing section 131 and the reference data 62 renewed by the reference renewing section 132. This comparison is performed for all X coordinates, thereby obtaining the comparison result for every X coordinate. Further, whether the slit light beam 31 is blocked or non-blocked is judged for every X coordinate based upon the comparison result.

Then, the blocking data 63 composed of the one-dimensional arrangement of the point data showing the judging result at each X coordinate is produced. Specifically, the blocking data 63 is composed of the one-dimensional arrangement of the point data corresponding to each position on the monitoring line 41, wherein each point data shows whether the slit light beam 31 is blocked or non-blocked at the corresponding position. In the blocking data 63 in this embodiment, the point data value showing the blocked state is represented by "1", while the point data value showing the non-blocked state is represented by "0". Therefore, the blocking data 63 is binary data composed of point data of 320 in width and 1 in length. The produced blocking data 63 is stored in the memory 14.

Upon comparing the line data 61 to the reference data 62, the "ratio" (P/Q) of the point data value P in the line data 61 to the point data value Q in the reference data 62 is obtained. If the "ratio" at some X coordinates is smaller than a predetermined threshold value, the slit light beam 31 at the position corresponding to this X coordinate is judged to be blocked, and contrary to this, if the "ratio" at some X coordinates is greater than a predetermined threshold value, the slit light beam 31 at the position corresponding to this X coordinate is judged to be non-blocked.

There is considered a judging technique (hereinafter referred to as a "difference value judging method") wherein the point data value P in the line data 61 is subtracted from the point data value Q in the reference data 62, and if this "difference value" (Q–P) is greater than a predetermined threshold value, the slit light beam 31 is judged to be blocked and if the "difference value" is smaller than the predetermined threshold value, the slit light beam 31 is judged to be non-blocked.

However, like this embodiment, using the judging technique based upon the "ratio" of the point data value (hereinafter referred to as "ratio judging method") instead of the "difference value judging method" can judge whether the slit light beam is blocked or non-blocked with high precision. The "difference value judging method" and the "ratio judging method" are compared hereinbelow.

Figure 14:
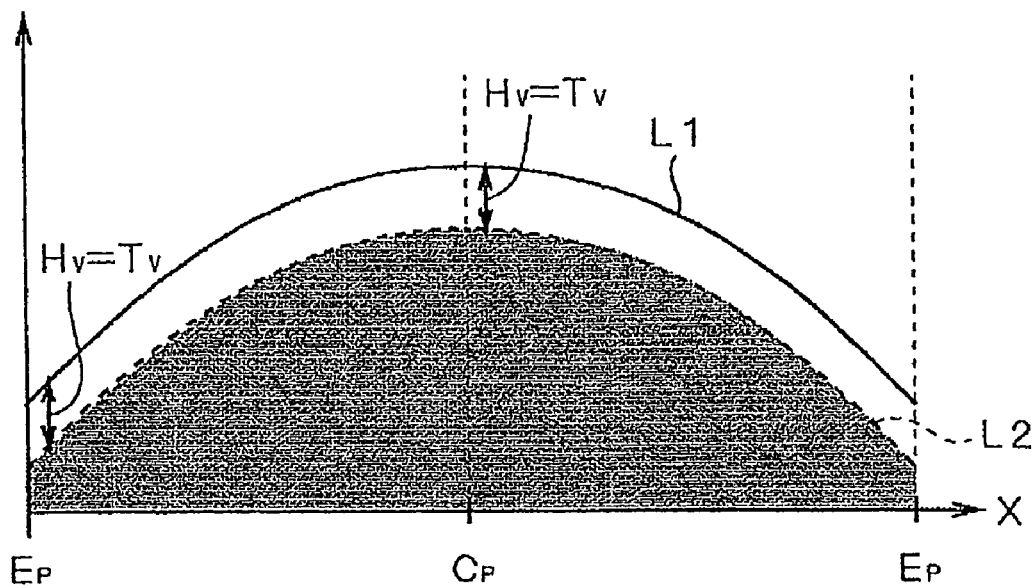
FIG. 14 is a drawing showing one example of a judging boundary line.
Figure 15:
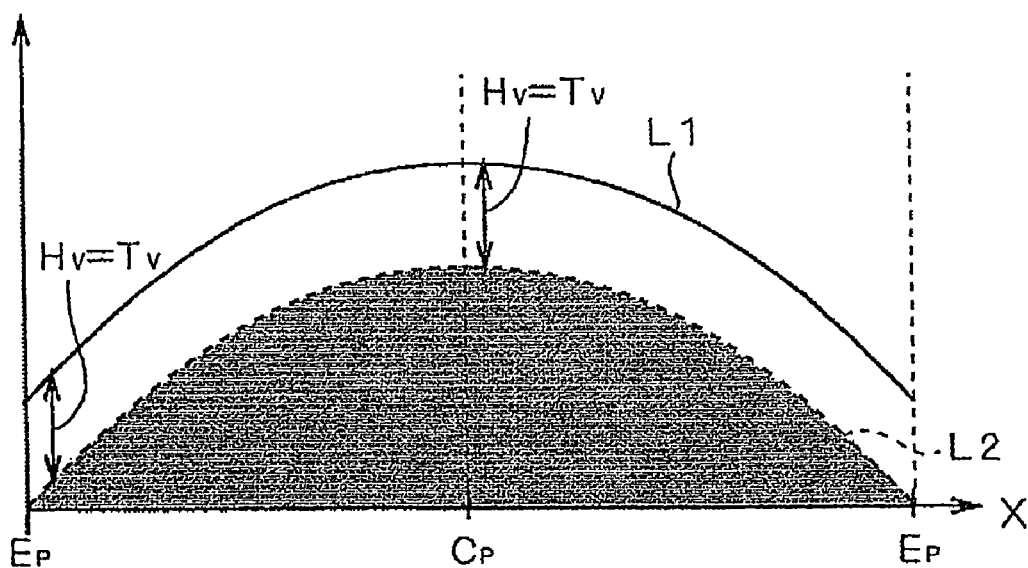
FIG. 15 is a drawing showing one example of a judging boundary line.
Figure 16:
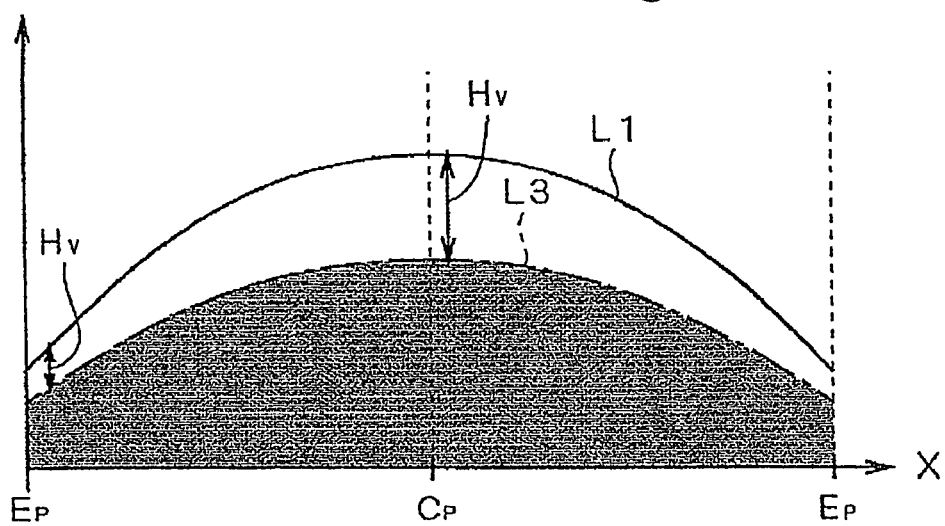
FIG. 16 is a drawing showing one example of a judging boundary line.

FIGS. 14 to 16 are drawings for showing a judging boundary line that serves as a boundary for the judge upon judging whether the slit light beam 31 is blocked or non-blocked based upon the point data value in the line data 61. FIGS. 14 and 15 show the case of the "difference value judging method", while FIG. 16 shows the case of the "ratio judging method". The axis of abscissa in each figure corresponds to the X-axis direction (the widthwise direction of the passage 4).

The solid line L1 in each figure indicates the point data value in the reference data 62 (hereinafter referred to as a "reference value"), and is called a "reference line L1" hereinafter. As shown in the figures, the reference value becomes relatively great in the vicinity of the central position Cp of the passage 4 and becomes smaller in the vicinity of the edge position Ep of the passage 4. This is because the irradiation intensity of the slit light beam 31 is not uniform for all positions on the monitoring line 41.

In order to provide uniform irradiation intensity of the slit light beam for the direction of its longer axis, a very complicated construction is required in the light projecting system that forms the slit light beam. Therefore, the irradiation intensity of the slit light beam becomes non-uniform in general for the direction of its longer axis. In this embodiment, the irradiation intensity of the slit light beam 31 becomes relatively great in the vicinity of the central position Cp of the passage 4 corresponding to the optical axis of the light projecting system and becomes smaller in the vicinity of the edge position Ep of the passage 4 that is apart from the optical axis.

The broken line L2 shown in FIGS. 14 and 15 indicates a value obtained by subtracting a judgment threshold value Tv in the "difference judging method" from the reference value. Accordingly, if the point data value in the line data 61 is included in the area below the broken line L2, the slit light beam 31 is judged to be in the blocked state in the "difference value judging method". Specifically, the broken line L2 serves as the judging boundary line in the "difference value judging method".

In the "difference value judging method", the judgment threshold value Tv is made equal for all positions on the monitoring line 41. Specifically, the difference Hv between the reference line L1 and the judging boundary line L2 is constant. Accordingly, when the judgment threshold value Tv is set to be relatively small as shown in FIG. 14, there may be a fear that the slit light beam 31 is misjudged to be blocked at the position Cp where the reference value is relatively great, only because the point data value in the line data 61 is somewhat reduced due to a noise or the like. On the other hand, when the judgment threshold value is set to be relatively great as shown in FIG. 15, the slit light beam 31 cannot be judged to be in the blocked state in any case at the position Ep where the reference value is relatively small. As described above, the possibility of the misjudgment increases when the "difference value judging method" is adopted.

On the other hand, the difference Hv between the reference line L1 and the judging boundary line changes according to the reference value in the "ratio judging method". The one-dot-chain line L3 in FIG. 16 shows a value obtained by multiplying the reference value by the judgment threshold value (for example, 2/3) in the "ratio judging method". Accordingly, if the point data value in the line data 61 is included in the area below the one-dot-chain line L3, the slit light beam 31 is judged to be in the blocked state in the "ratio judging method". Specifically, the one-dot-chain line L3 serves as the judging boundary line in the "ratio judging method".

Therefore, the difference Hv between the reference line L1 and the judging boundary line L3 is in accordance with the reference value in the "ratio judging method", wherein it becomes great at the position Cp where the reference value is relatively great and becomes small at the position Ep where the reference value is relatively small. Accordingly, the aforesaid misjudgment caused in the "difference value judging method" at the positions Cp and Ep can be eliminated. Consequently, the judging precision for judging whether the slit light beam is blocked or non-blocked can be enhanced.

2-4. Person Detecting Process

Subsequently, the person detecting process (FIG. 3: step S7) by the person detecting section 134 will be explained in detail.

In the blocking data 63, the point data value corresponding to the position where the slit light beam 31 is blocked by a moving object other than a person also takes "1". Specifically, the blocking data 63 includes information relating to the moving object other than a person. Therefore, information relating to a person is only extracted from the blocking data 63 in the person detecting process.

Figure 17:
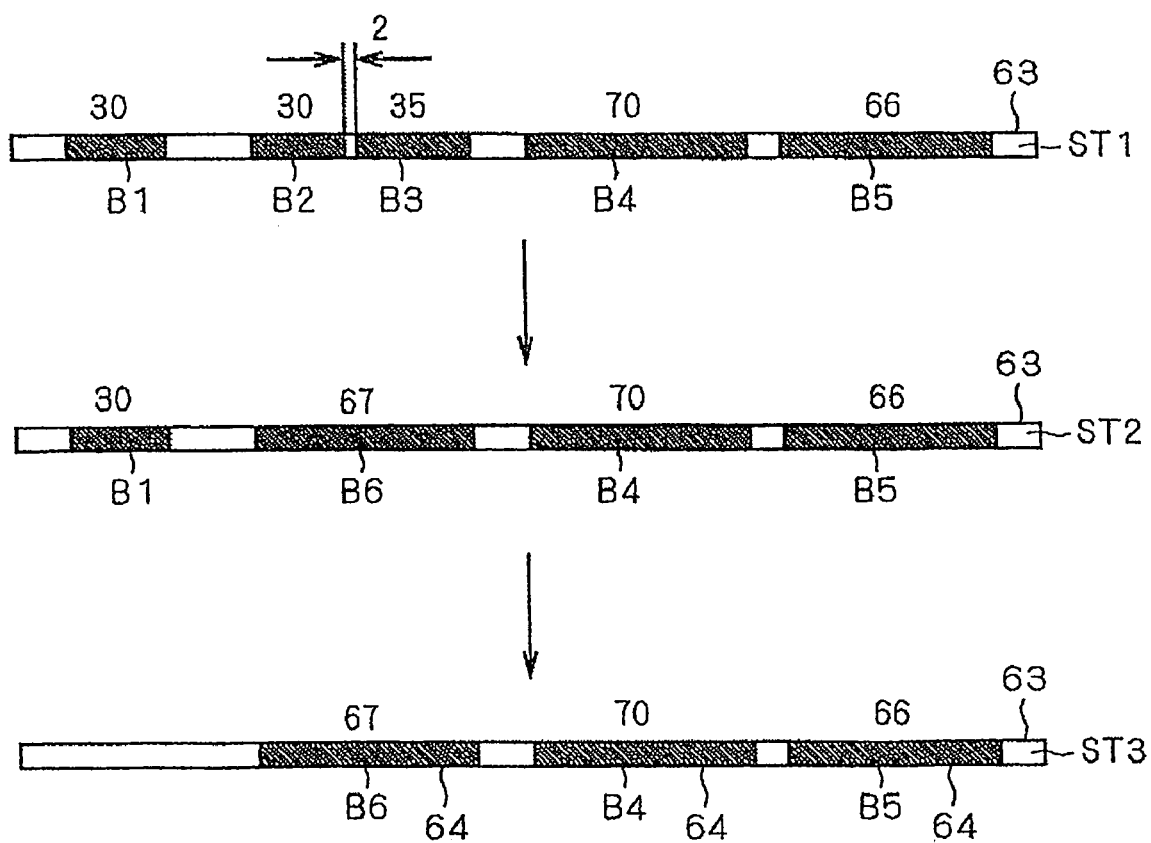
FIG. 17 is a drawing conceptionally showing a content of a person detecting process.

FIG. 17 is a drawing conceptually showing a content of the person detecting process. In this figure, the positions of the point data taking the value of "1" in the blocking data 63 are indicated by hatching. In the person detecting process, a group of point data whose value is continuously "1" from the viewpoint of position is interested as a candidate of the information relating to a person (hereinafter referred to as "person candidate data"). The blocking data 63 in the initial state ST1 shown in FIG. 17 includes five pieces of person candidate data B1 to B5, each of the continuous number of the point data being "30", "30", "35", "70" and "66".

Upon performing the person detecting-process, a noise in the blocking data 63 is firstly eliminated. Specifically, among the group of the point data whose value is continuously "0" from the viewpoint of position, the point data having the continuous number of, for example, not more than "2" is judged to be a noise, whereby the value thereof is changed to "1". This makes it possible to restore the person candidate data that is cut by the noise. For example, the blocking data 63 in the initial state ST1 shown in FIG. 17 includes a group of point data taking the value of "0" and its continuous number of "2" between the person candidate data B2 and the person candidate data B3. Therefore, the value of this group of point data is changed to "1", whereby person candidate data B6 that is divided into the person candidate data B2 and the person candidate data B3 is restored (state ST2).

Subsequently, the point data having the continuous number of less than "60" among the person candidate data is regarded to be the information relating to a moving object other than a person, whereby its value is changed to "0". For example, the blocking data 63 in the state of ST2 shown in FIG. 17 includes the person candidate data B1 whose continuous number is "30". Therefore, this value is changed to "0", whereby the person candidate data B1 is erased (state ST3).

The person candidate data left in the blocking data 63 after this process is regarded to be the information relating to a person, so that the respective coordinates of the data are obtained as the person information 64. In the blocking data 63 in the state ST3 shown in FIG. 17, the person candidate data pieces B4, B5 and B6 are regarded to correspond to a person. The obtained person information 64 is stored in the memory 14.

2-5. Counting Process

Subsequently, the counting process by the counting section 135 (FIG. 3: step S8) will be explained in detail. In the counting process, the number of the person information 64 extracted by the person detecting process is counted. Since the routine process is repeated, there may be a fear that the person information 64 relating to the same person is repetitively counted. Therefore, it is judged in the counting process whether the person information 64 detected in the last-time routine process and the person information 64 detected by the this-time routine process relate to the same person or not. According to this process, the person information 64 relating to the same person who is present in the last-time process is not counted. Whether two pieces of the person information 64 relate to the same person or not is judged based upon the coordinates shown by the person information 64. The counting result is transmitted from the communication section 15 to the monitoring device 2, to thereby be displayed on the display of the monitoring device 2.

As explained above, the moving object detecting system 101 in this embodiment adopts the "adjacent pixel difference method" in the data producing process and adopts the "ratio judging method" in the block judging process. Therefore, the slit light beam can accurately be judged to be blocked or non-blocked in the block judging process, thereby being capable of dramatically enhancing the judging precision in the block judging process.

3. Modified Example

Although the embodiment according to the present invention has been explained, the invention is not limited to the above-mentioned embodiment, and various modifications are possible.

Figure 18:
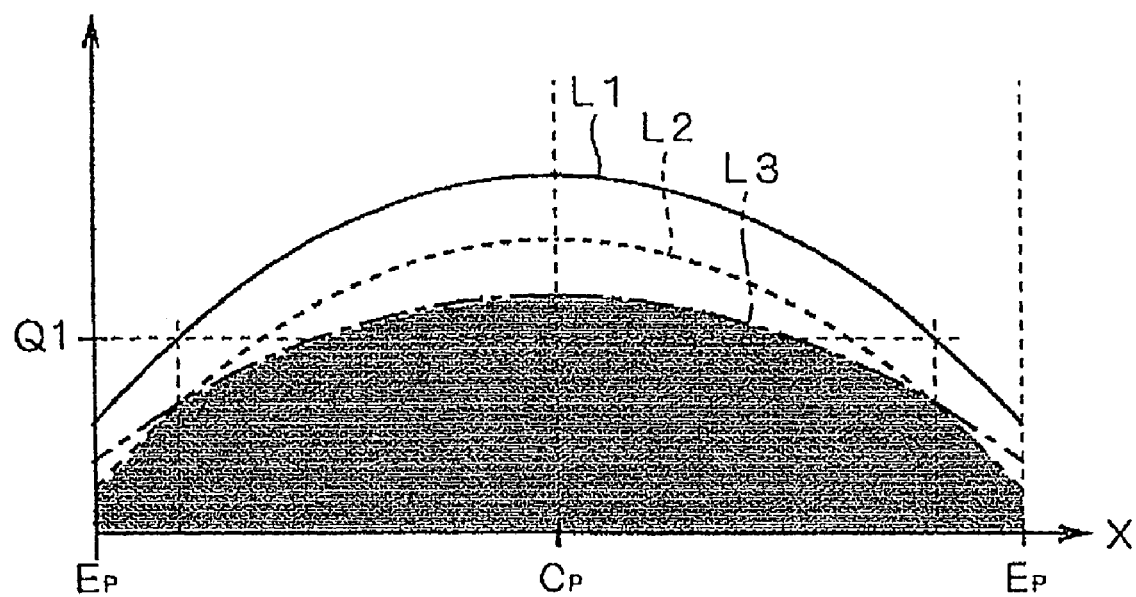
FIG. 18 is a drawing showing one example of a judging boundary line.

Both of the "ratio judging method" and the "difference value judging method" may be used, wherein the slit light beam may be judged to be blocked only in case where the condition by which the slit light beam is judged to be blocked is satisfied in both judging methods. Specifically, if the point data value in the line data 61 is included in the area (shown by hatching) below the judging boundary line L2 by the "difference value judging method" and the judging boundary line L3 in the "ratio judging method" as shown in FIG. 18, the slit light beam 31 is judged to be blocked. In the example shown in FIG. 18, the "ratio judging method" is adopted at the position where the reference value is greater than a predetermined value Q1, while the "difference value judging method" is adopted at the position where the reference value is smaller than the predetermined value Q1.

According to this, whether the slit light beam is blocked or non-blocked is judged by the conditions of both "ratio judging method" and the "difference value judging method", thereby being capable of more suitably judging whether the slit light beam is blocked or non-blocked. There may be a fear that the slit light beam is misjudged to be blocked only by using the "ratio judging method" when a noise occurs at the position Ep where the reference value is relatively small, for example. However, the misjudgment can be prevented by using, together with the "ratio judging method", the "difference value judging method" wherein the judgment threshold value Tv considering the effect of the noise is set.

Although the data producing section 131, reference renewing section 132, block judging section 133, person detecting section 134 and counting section 135 are explained as a function of the imaging device 1 in the above embodiment, a part of or all of these functions may be included in the monitoring device 2. Specifically, a part of or all of the processes at the steps S4 to S8 that are intended to be performed by the imaging device 1 may be performed by the monitoring device 2 in this embodiment. This makes it possible to reduce the processing amount that should be performed by the imaging device 1. Further, a popular digital camera can be used as the imaging device 1, if all processes at the steps S4 to S8 are performed by the monitoring device 2.

Although the moving object that is a subject to be detected is a person in the aforesaid embodiment, any moving object is possible so long as it is a non-transparent object moving on a predetermined passage, such as an object like goods, vehicle like an automobile, an animal or the like.

Obviously, many modifications and variation of the present invention are possible in light of the above teachings. It is therefore to be understood that within the scope of the appended claims, the invention may be practiced other than as specifically described.

According to the moving object detecting system of the embodiment, the point data value of the line data depends upon the result of the difference between pixel values of the respective adjacent pixels of the pixel array. Therefore, the pixel value by the reflection light of the slit light beam from the surface of the moving object is offset between the adjacent pixels, not being reflected on the point data value of the line data. As a result, the point data value of the line data corresponding to the blocked state can clearly be differed from the point data value of the line data corresponding to the non-blocked state, thereby being capable of enhancing the judging precision upon judging whether the slit light beam is blocked or non-blocked.

Moreover, whether the slit light beam is blocked or non-blocked can accurately be judged based upon the comparison between the line data and the reference data.

Further, the system of the embodiment can provide an accurate judgment of whether the slit light beam is blocked or non-blocked by renewing the reference data based upon the predetermined number of line data most lately produced, even if environmental light to the line is changed.

Additionally, the system of the embodiment provides a judgment of whether the slit light beam is blocked or non-blocked based upon the ratio of the point data value. Therefore, even if the quantity of the slit light beam is non-uniform on the line, the judgment of whether the slit light beam is blocked or non-blocked can suitably be made relating to any position on the line, thereby being capable of enhancing the judging precision.

Further, the system of the embodiment provides a judgment of whether the slit light beam is blocked or non-blocked based upon the ratio of the point data value. Therefore, even if the quantity of the slit light beam is non-uniform on the line, the judgment of whether the slit light beam is blocked or non-blocked can suitably be made relating to any position on the line, thereby being capable of enhancing the judging precision.

Moreover, the system of the embodiment provides a judgment of whether the slit light beam is blocked or non-blocked based upon both the ratio of the point data value and the difference value, thereby being capable of further suitably judging whether the slit light beam is blocked or non-blocked.

What is claimed is:

1. A moving object detecting system for detecting a moving object in a passage, comprising:
    a light projecting device which irradiates a slit light beam to a line as a subject to be irradiated along a widthwise direction of the passage;
    a imaging device which image-captures an area including the line to obtain an image;
    a producing portion which produces, from the image, line data of one-dimensional arrangement of point data corresponding to each position on the line;
    a judging portion which judges whether the slit light beam is blocked or non-blocked at each position on the line based upon the line data; and
    a detecting portion which detects the moving object based upon the result of the judgment by the judging portion,
    wherein, when a direction corresponding to the widthwise direction is defined as a first direction and a direction perpendicular to the first direction is defined as a second direction in the image and the line data, a value of an evaluation function taking each pixel value of a pixel array in the image arranged in the second direction as an argument is rendered by the producing portion to be a value of point data in the line data having the same position as that of the pixel array in the first direction, the evaluation function value depending upon the result of the difference between the pixel values of adjacent pixels in the pixel array.

2. The moving object detecting system claimed in claim 1,
    wherein the judging portion compares values of the corresponding point data between the reference data corresponding to the line data of when the slit light beam is non-blocked in the whole line and the line data most lately produced, and judges whether the slit light beam at each position on the line is blocked or non-blocked based upon the comparison result.

3. The moving object detecting system claimed in claim 2,
    wherein an area including the line is repeatedly image-captured at a predetermined time cycle, wherein the line data is repeatedly produced at the predetermined time cycle from the image obtained by the image-capture, and
    the system further comprises renewing portion for renewing the reference data based upon the predetermined number of the line data most lately produced.

4. The moving object detecting system claimed in claim 2,
    wherein the comparison result includes a ratio of the other point data value to one point data value of the reference data and the line data.

5. The moving object detecting system claimed in claim 1,
    wherein the value of the evaluation function is the maximum value of the secondary differential values obtained relating to each pixel of the pixel array.

6. The moving object detecting system claimed in claim 1,
    wherein the value of the evaluation function is a total sum of a contrast in the pixel array.

7. A moving object detecting system for detecting a moving object in a passage, comprising:
    a light projecting device which irradiates a slit light beam to a line as a subject to be irradiated along a widthwise direction of the passage;
    a imaging device which image-captures an area including the line to obtain an image;
    a producing portion which produces, from the image, line data of one-dimensional arrangement of point data corresponding to each position on the line;
    a judging portion that compares corresponding point data values between the reference data corresponding to the line data of when the slit light beam is non-blocked in the whole line and the line data most lately produced, and judges whether the slit light beam at each position on the line is blocked or non-blocked based upon the comparison result; and
    a detecting portion which detects the moving object based upon the result of the judgment by the judging portion,
    wherein the comparison result includes a ratio of the other point data value to one point data value of the reference data and the line data.

8. The moving object detecting system claimed in claim 4,
    wherein the comparison result further includes a difference value between one point data value and the other point data value of the reference data and the line data.

9. A method for detecting a moving object in a passage, comprising steps of:
    (a) irradiating a slit light beam to a line as a subject to be irradiated along a widthwise direction of the passage as well as for image-capturing an area including the line to thereby obtain an image;
    (b) producing, from the image, line data of one-dimensional arrangement of point data corresponding to each position on the line;
    (c) judging whether the slit light beam at each position on the line is blocked or non-blocked based upon the line data; and
    (d) detecting the moving object based upon the result of the judgment by the step (c),
    wherein, when the direction corresponding to the widthwise direction is defined as a first direction and the direction perpendicular to the first direction is defined as a second direction in the image and the line data, the value of an evaluation function taking each pixel value of the pixel array in the image arranged in the second direction as an argument is rendered to be a value of point data in the line data having the same position as that of the pixel array in the first direction in the step (b), the evaluation function value depending upon the result of the difference between the pixel values of the adjacent pixels in the pixel array.

10. A method for detecting a moving object in a passage, comprising steps of:
    (a) irradiating a slit light beam to a line as a subject to be irradiated along a widthwise direction of the passage as well as for image-capturing an area including the line to thereby obtain an image;
    (b) producing, from the image, line data composed of one-dimensional arrangement of point data corresponding to each position on the line;
    (c) comparing corresponding point data values between the reference data corresponding to the line data of when the slit light beam is non-blocked in the whole line and the line data most lately produced, and judging whether the slit light beam at each position on the line is blocked or non-blocked based upon the comparison result; and (d) detecting the moving object based upon the result of the judgment by the step (c), wherein the comparison result includes a ratio of the other point data value to one point data value of the reference data and the line data.

11. A moving object detecting apparatus for detecting a moving object in a passage, comprising:
   a light projecting device which irradiates a slit light beam to a line along a widthwise direction of the passage;
   a imaging device which captures an image data of an area including the line;
   a line data producing section which produces a point data from the image data by an operation including at least difference value between the pixel values of adjacent pixels in a pixel array orthogonal to the line, and produces a line data of one-dimensional arrangement of point data corresponding to each position on the line;
   a judging section which judges whether the slit light beam is blocked or not blocked at each position on the line based upon the line data,
   wherein the judging section judges whether the slit light beam is blocked or not blocked by ratio of the line data obtained to a reference line data which indicates a line data where an object does not exist in the passage.

12. A moving object detecting apparatus for detecting a moving object in a passage, comprising:
   a light projecting device which irradiates a slit light beam to a line along a widthwise direction of the passage;
   a imaging device which captures an image data of an area including the line;
   a line data producing section which produces a point data from the image data by an operation including at least difference value between the pixel values of adjacent pixels in a pixel array orthogonal to the line, and produces a line data of one-dimensional arrangement of point data corresponding to each position on the line;
   a judging section which judges whether the slit light beam is blocked or not blocked at each position on the line based upon the line data,
   wherein the operation including at least difference value obtains a plurality of values in the pixel array and obtains a maximum value among the obtained plurality of secondary differential values.

13. A moving object detecting apparatus for detecting a moving object in a passage, comprising:
   a light projecting device which irradiates a slit light beam to a line along a widthwise direction of the passage;
   a imaging device which captures an image data of an area including the line;
   a line data producing section which produces a point data from the imaae data by an operation including at least difference value between the pixel values of adjacent pixels in a pixel array orthogonal to the line, and produces a line data of one-dimensional arrangement of point data corresponding to each position on the line;
   a judging section which judges whether the slit light beam is blocked or not blocked at each position on the line based upon the line data,
   wherein the operation including at least difference value obtains total sum of contrast in the pixel array.

* * * * *

UNITED STATES PATENT AND TRADEMARK OFFICE
CERTIFICATE OF CORRECTION

PATENT NO. : 7,154,079 B2  Page 1 of 1
APPLICATION NO. : 10/955515
DATED : December 26, 2006
INVENTOR(S) : Shin Anei It is certified that error appears in the above-identified patent and that said Letters Patent is hereby corrected as shown below:

Column 19, claim 11, line 13, before "imaging device" replace "a" with --an--.

Column 19, claim 12, line 32, before "imaging device" replace "a" with --an--.

Column 20, claim 13, line 18, before "imaging device" replace "a" with --an--.

Column 20, claim 13, line 21, before "data by an operation" replace "imaae" with --image--.

Signed and Sealed this

Fourteenth Day of September, 2010

David J. Kappos
*Director of the United States Patent and Trademark Office*